United States Patent [19]

Kuriyama

[11] Patent Number: 5,424,591

[45] Date of Patent: Jun. 13, 1995

[54] VOICE COIL MOTOR

[75] Inventor: Yoshihiko Kuriyama, Kumagaya, Japan

[73] Assignee: Hitachi Metals, Ltd., Japan

[21] Appl. No.: 158,778

[22] Filed: Dec. 1, 1993

[30] Foreign Application Priority Data

Dec. 4, 1992 [JP] Japan .................. 4-325283

[51] Int. Cl.$^6$ .................................. H02K 41/02
[52] U.S. Cl. ...................................... 310/12
[58] Field of Search ............. 310/42, 12, 13, 14; 360/105, 106

[56] References Cited

U.S. PATENT DOCUMENTS

| | | | |
|---|---|---|---|
| 3,984,706 | 10/1976 | Inouye | 310/12 |
| 4,805,055 | 2/1989 | Wright | 360/106 |
| 4,888,506 | 12/1989 | Umehara et al. | 310/13 |
| 5,051,669 | 9/1991 | Hsiao et al. | 318/119 |
| 5,113,099 | 5/1992 | Wong et al. | 310/13 |
| 5,243,248 | 9/1993 | Benford et al. | 310/256 |

*Primary Examiner*—Steven L. Stephan
*Assistant Examiner*—Judson H. Jones

[57] ABSTRACT

A voice coil motor including (a) an E-shaped yoke having a center yoke portion and side yoke portions and constituted by a plurality of thin plates having the same configuration and stacked together; (b) a counter yoke member secured to an open end of the yoke; (c) permanent magnets secured to inner sides of the side yoke portions such that the same magnetic poles are opposed; (d) a hollow, cylindrical, movable coil supported for movements along the center yoke portion; and (e) a covering made of a corrosion-resistant material and provided integrally on outer surfaces of the yoke and the permanent magnets.

8 Claims, 4 Drawing Sheets

VOICE COIL MOTOR

BACKGROUND OF THE INVENTION

The present invention relates to a voice coil motor to be used, for example, as means for positioning a magnetic head in a magnetic disk apparatus, and so on, and more particularly to an improved voice coil motor whose components can be fabricated at a low cost with a high accuracy.

Voice coil motors have conventionally been used in various applications because of their simple structures and their excellent performances as driving means for high-speed straight or swinging movements. In a magnetic disk apparatus, in particular, which is required to effect quick and accurate movements of a magnetic head from one track position to another, voice coil motors, which need less access time than other types of motors, have widely been used as means for positioning the magnetic head (see for instance, U.S. Pat. No. 4,505,055, Japanese Patent Laid-Open Nos. 64-89946 and 4-311888).

FIG. 1 is a plan view illustrating a voice coil motor to which the present invention is applied. In FIG. 1, reference numeral 1 denotes an E-shaped yoke made of a soft-magnetic material such as soft iron, which comprises an arcuate center yoke portion 2 and arcuate side yoke portions 3, 3. Secured to the open end of the yoke 1 with screws, etc. is a counter yoke member 4 constituted by a flat plate made of a ferromagnetic material.

Numeral 5 denotes permanent magnets each having an arcuate cross section and magnetized in its radial direction. The permanent magnets 5, 5 are secured to inner sides of the side yoke portions 3, 3 by an adhesive, etc. with the same magnetic pole adjacent thereto, and magnetic gaps 6, 6 are provided between the center yoke portion 2 and the permanent magnets 5, 5. Numeral 7 designates an arm having one end to which a hollow rectangular-cylindrical movable coil 8 is secured and having the other end to which a function member such as a magnetic head (not shown) is secured. The arm 7 is swingably or pivotally supported by a shaft 9 such that the movable coil 8 is located in the magnetic gaps 6 between the permanent magnets 5 and the center yoke portion 2. Numeral 10 refers to a plurality of screw holes opening at one surface of the yoke 1.

When a current is supplied to the movable coil 8, a driving force around the shaft 9 is produced by the movable coil 8 according to the Fleming's left hand rule. This force causes the arm 7 to pivot or swing to bring the magnetic head at the other end of the arm 7 to a desired recording track on a magnetic disk. The direction of the pivotal or swinging movements of the arm 7 can be changed by inverting the direction of a current applied to the movable coil 8.

The yoke 1 for the above-described voice coil motor is conventionally fabricated from an iron-based, ferromagnetic material as described above by a forming method such as cold forging, powder metallurgy, and precision casting. The concave and convex surfaces of the center yoke portion 2 and the side yoke portions 3 constituting the yoke 1 should be mechanically worked to a dimensional tolerance of 0.05 mm or less, for example, in order to ensure a high mounting accuracy of the permanent magnets 5 and a high dimensional accuracy of the magnetic gaps 6.

However, mechanical working of the concave and convex surfaces of the yoke 1 with a high accuracy is generally much complicated and hence requires a number of working steps and much working time. This invites an increase in mechanical working cost and thence an increase in manufacturing cost of the voice coil motor.

In addition, if the yoke 1 is formed by a method such as precision casting, it would have magnetic properties corresponding to those of S10C, particularly a saturation magnetic flux density Bs of 1.6 to 1.7(T). On the other hand, a steel plate (SS41, SPC, etc.) used to make a flat-type voice coil motor has a saturation magnetic flux density Bs of about 1.8(T), meaning that the mechanical working leads to the degradation of magnetic properties.

Since the yoke 1 has a complicated configuration as a whole as shown in FIG. 1, shaping of a material therefor is difficult and decreases the productivity. Further, since any of the above forming methods needs an expensive die having a complicated shape, the manufacturing cost of the voice coil motor is necessarily high.

Recently, there are more strict requirements for miniaturization and cost reduction of this sort of voice coil motors. The conventional structures, however, increase the manufacturing cost, failing to meet the requirements.

OBJECTS AND SUMMARY OF THE INVENTION

It is therefore an object of the present invention to provide a voice coil motor that solves the problems involved in the prior art and can be manufactured with a high accuracy at a low cost.

In order to attain the above object, the inventor has found that by constituting the yoke by a plurality of thin plates and by integrally covering the yoke and the permanent magnet attached thereto with a corrosion-resistant material, a voice coil motor showing high performance can be produced with a high accuracy at a low cost.

Thus, the first voice coil motor comprises an E-shaped yoke having a center yoke portion and side yoke portions, the yoke being constituted by a plurality of thin plates having the same configuration as that of the yoke and stacked together; a counter yoke member secured to an open end of the yoke, permanent magnets secured to inner sides of the side yoke portions such that the same magnetic poles are opposed; a movable coil supported for movements along the center yoke portion which has a hollow cylindrical shape; and a covering made of a corrosion-resistant material and provided on outer surfaces of the yoke and the permanent magnets.

The second voice coil motor comprises a U-shaped yoke constituted by a plurality of thin plates having the same configuration as that of the yoke and stacked together; a counter yoke member secured to an open end of the yoke; permanent magnets secured to inner sides of the yoke such that different magnetic poles are opposed; a movable coil supported for movements in a magnetic gap between the permanent magnets; and a covering made of a corrosion-resistant material and provided on outer surfaces of the yoke and the permanent magnets.

According to a preferred embodiment of the present invention, projections may be formed in part in multilayered thin plates by burring, and the projections may be threaded to behave as female screws.

In addition, an end plate made of a soft-magnetic material may be fixed to an open end of the yoke such that extensions of the end plate engages opposite sides of the yoke, and the end plate may be covered, together with the yoke, by a corrosion-resistant material.

DETAILED DESCRIPTION OF THE PREFERRED EMBODIMENTS

Figure 1:
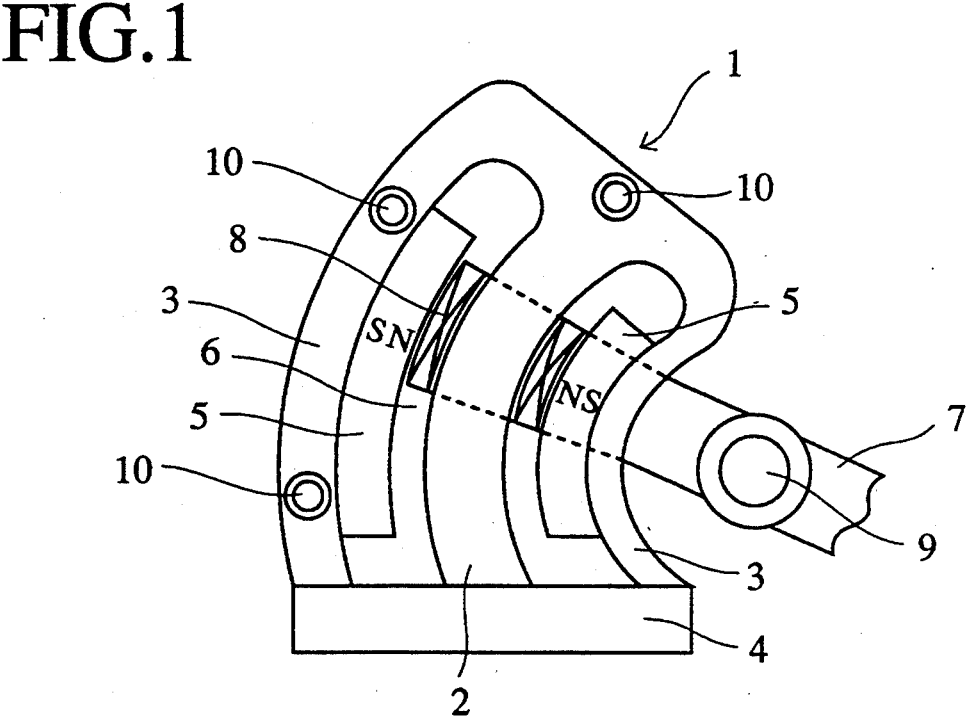
FIG. 1 is a plan view illustrating a voice coil motor to which the present invention is applied.
Figure 2:
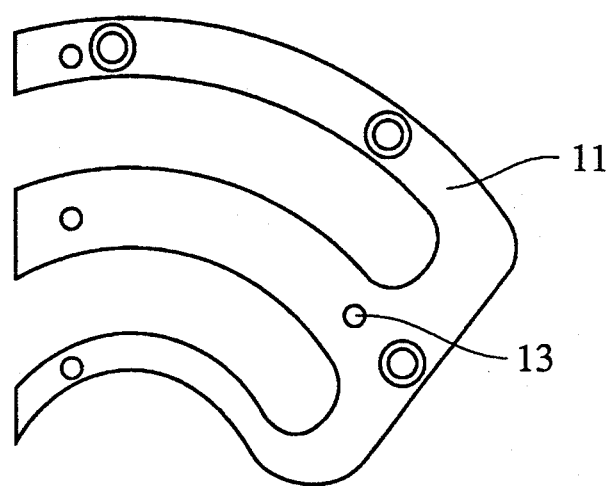
FIG. 2 is a plan view illustrating a major part of a yoke in an embodiment of the present invention.
Figure 3:
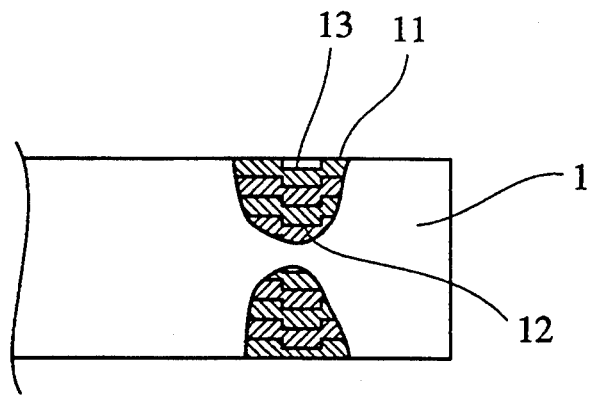
FIG. 3 is a partly cross-sectional side elevation of a major part of the yoke in the embodiment of the present invention.

FIGS. 2 and 3 are a plan view and a partly cross-sectional side elevation of a major part of a yoke used in an embodiment of the present invention. In these figures, reference numeral 11 denotes a thin plate made of a soft-magnetic metal and having the same shape as that of the yoke 1 shown in FIG. 1.

The thin plates 11 constituting the yoke 1 are preferably punched out from a large thin plate made of soft iron such as SPCC by a punch die set. In this case, the punched thin plates may be stacked successively in the punch die. The thin plates 11 may be joined together in direct contact, for example, by engagement between projections and recesses in a joggle joint, or in indirect contact via an adhesive interposed between respective layers. Also, both the joggle joint and the adhesive may be used to fix the thin plates 11. Alternatively, they may be joined together by providing through-holes in the laminated structure and by inserting rivets or other clamping means in the through-holes after stacking the layers.

Figure 4:
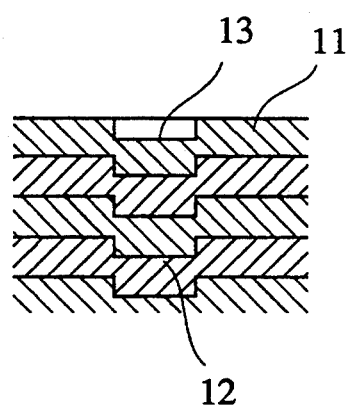
FIG. 4 is a enlarged cross-sectional view of projections 12 and recesses 13 in the joggle joint.

Numerals 12 and 13 respectively denote a projection and a recess in a joggle joint. As best shown in FIG. 4 on an enlarged scale, each thin plate 11 has a joggle joint constituted by a projection 12 and a recess 13 having the same outer and inner diameters and having a height and a depth smaller than the thickness of the thin plate 11. To make such projection 12 and recess 13, the thin plate 11 is preferably punched by a die set equipped with a so-called half-punch means comprising a punch and a die for projection 12 and recess 13. Alternatively, a predetermined number of thin plates 11 may be stacked in a die so that projections 12 and recesses 13 are formed at a time. In this case, the forming of the projections 12 and the recesses 13 serves to joint the thin plates 11 together. Incidentally, their surfaces are coated with an insulating material such as an epoxy resin adhesive (for instance, Araldite AV138).

Figure 5:
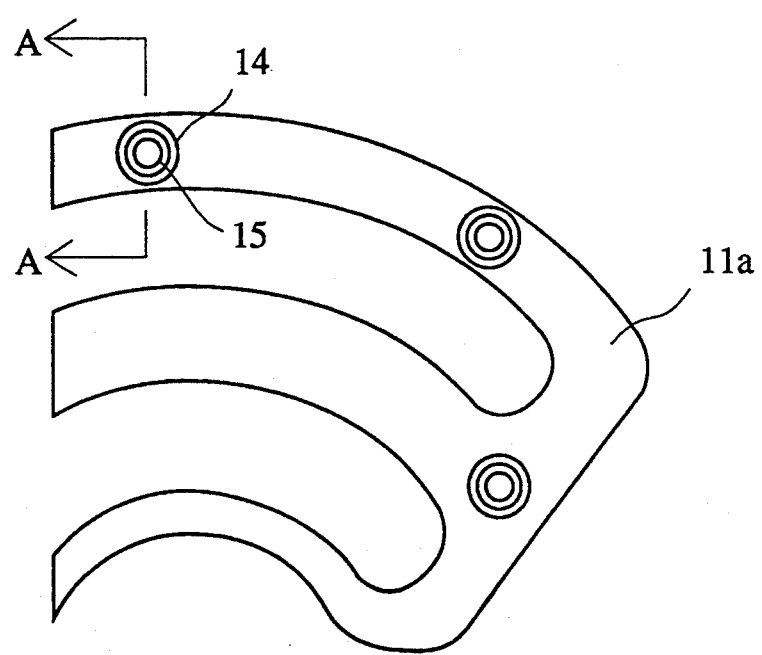
FIG. 5 is a plan view of an uppermost one of the thin plates constituting a yoke in the embodiment of the present invention.
Figure 6:
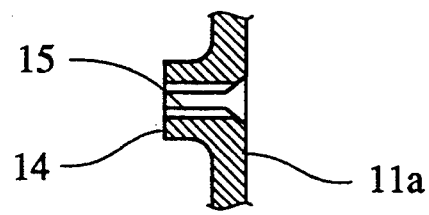
FIG. 6 is a cross-sectional view taken along the A—A line of FIG. 5.

FIG. 5 is a plan view of an uppermost one of the thin plates constituting the yoke 1 used in the embodiment of the present invention. FIG. 6 is a cross-sectional view taken along the A—A line of FIG. 5. In FIGS. 5 and 6, numeral 14 denotes projections provided at appropriate positions in the top thin plate 11a and are threaded to behave as female screws 15. The threaded projections 14 are used to fix the yoke 1 to a housing of a hard disk drive via screws. To make the projections 14, a drawing method called "burring" is preferably used. The top thin plate 11a is preferably thicker than the thin plate 11 of FIG. 2.

Each thin plate 11 has a plurality of projections (not shown) on its lower surface at positions corresponding to the recesses 13 shown in FIG. 2 such that the contour of the yoke 1 and the contour of the top thin plate 11a be accurately aligned.

Figure 7:
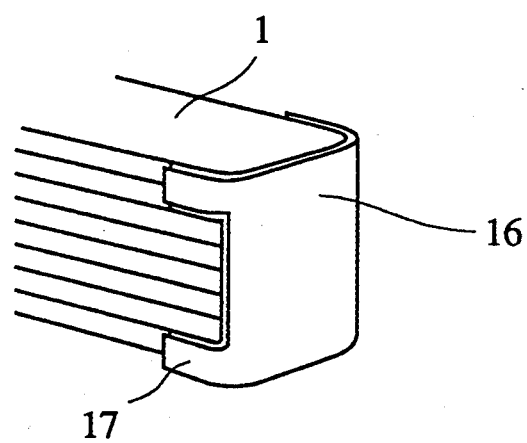
FIG. 7 is a partial perspective view of an open end of the yoke 1 shown in FIG. 3.

FIG. 7 is a partial perspective view of the open end of the yoke 1 shown in FIG. 3. In FIG. 7, numeral 16 denotes a flat end plate made of the same soft-magnetic material as that of the thin plate 11 and having extensions 17 integrally projecting from both sides for holding the yoke 1 from both sides.

The top thin plate 11a is put on the top of the yoke 1 constituted by stacked thin plates 11, and the end plate 16 is secured to the open end of the yoke 1. With magnetized permanent magnets (see numeral 5 in FIG. 1) attracted to the yoke 1 at predetermined positions, the yoke 1 is inserted into a die, and a thermoplastic resin such as polyphenylene sulfide, polycarbonate, unsaturated polyester, liquid-crystal plastics or other engineering plastics is injected into the die to mold the resin integrally with the yoke 1 and the permanent magnets 5 except for outer surfaces of the end plate 16. The resultant covering not only prevents corrosion of surfaces of the respective components (yoke 1 and permanent magnets 5) but also prevents relative movements of the respective components. After inserting the center yoke portion 2 into the movable coil 8 of the arm 7, the counter yoke 4 is secured to the end plate 16 attached to the open end of the yoke 1.

The permanent magnets 5 attached to the yoke 1 may be made of an R-Fe-B alloy (rare earth-iron-boron). In this case, the R-Fe-B alloy preferably includes 10 to 30 atomic % of a rare earth element R. With R less than 10 atomic %, the magnetic properties (particularly coercive force) of the R-Fe-B alloy are degraded. With R more than 30 atomic %, R-rich non-magnetic phases increase, and the residual magnetic flux density decreases.

The preferable rare earth elements R are neodymium (Nd) and praseodymium (Pr). Among them, Nd, which is abundant in resources and relatively inexpensive, is most generally used. In order to improve the coercive force, part of R (about 1 to 30%) may be replaced with one or more of heavy rare earth elements such as dysprosium (Dy), holmium (Ho) and terbium (Tb). In addition, R may include at least one element selected from the group consisting of lanthanum (La), cerium (Ce), samarium (Sm), gadolinium (Gd), erbium (Er), europium (Eu), thulium (Tin), terbium (Tb) and yttrium (Y).

The R-Fe-B alloy preferably includes 65 to 85 atomic % of Fe. With Fe less than 65 atomic %, the residual magnetic flux density of the alloy decreases, and with that more than 85 atomic %, the coercive force decreases.

The alloy preferably includes 2 to 28 atomic % of B. With B less than 2 atomic %, the coercive force decreases. With that more than 28 atomic %, B-rich nonmagnetic phases increase, resulting in a decrease in a residual magnetic flux density.

In addition to the above-mentioned indispensable components, the R-Fe-B alloy possibly includes impurities such as oxygen ($O_2$) that are inevitable in the manufacturing process. Further, the R-Fe-B alloy may include one or more known additional elements such as cobalt (Co), aluminum (Al) and titanium (Ti). These additional elements are disclosed in, for example, Japanese Patent Laid-Open Nos. 60-162754 and 61-87825.

The permanent magnets in the form of an arc segment or a hollow cylinder used in the present invention may be fabricated in the following manner: First, the R-Fe-B alloy is molten in argon (Ar) or in vacuum by a normal method. B may be added in the form of ferroboron. Rare earth elements are preferably added last. The resultant ingot is crushed and milled. The crushing may be carried out by stamping mills, jaw crushers, Brown mills, disk mills, etc., and the milling may be carried out by jet mills, vibrating mills, ball mills, etc. In any case, crushing and milling are conducted in a non-oxidizing atmosphere to prevent oxidation, and for this purpose, an organic solvent or an inert gas is preferably used.

A preferable grain size after crushing and milling is 2 to 5 $\mu$m (measured by a Fischer sub-sieve sizer). The magnetic powder thus obtained is shaped into a predetermined arc segmental or hollow-cylindrical body in a magnetic field. The green body thus obtained is sintered at 950° to 1150° C. for 20 minutes to two hours in an inert gas such as Ar and He, in vacuum or in hydrogen. The sintered body undergoes a heat treatment in an inert gas atmosphere, when necessary. Preferable conditions for the heat treatment are 500° to 700° C. and 30 minutes to three hours. Finally, magnetization is conducted in alignment with the orientation of the magnetic powder (in this case, in a radial direction). A preferable magnetic field intensity for the magnetization is 5 to 30 kOe.

Since the yoke 1 is normally made of an iron-based material, the outer surface thereof is covered with a corrosion-resistant material to protect it against corrosion. Any known resin materials may be used for this purpose. As a method for making the coveting, coating, spraying or injection molding in which a resin material is injected into a die in which a laminated structure is placed in advance may be employed.

Figure 8:
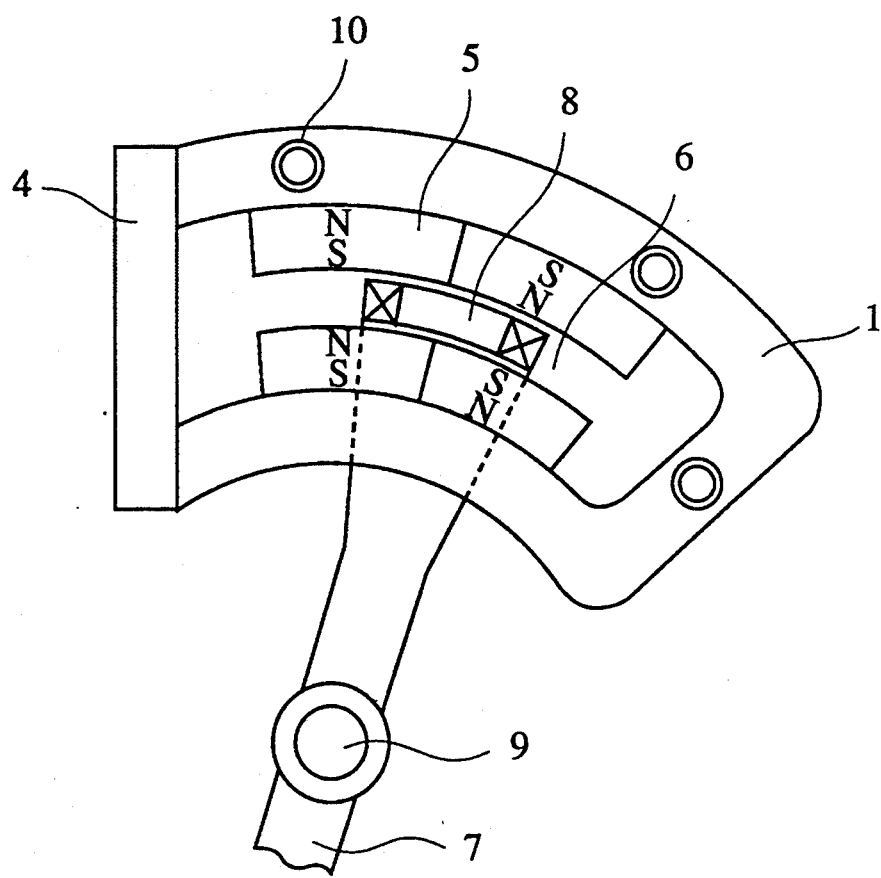
FIG. 8 is a plan view of another voice coil motor to which the present invention is applied.

FIG. 8 is a plan view of another voice coil motor to which the present invention is applied. The same elements as those of FIG. 1 are labeled with the same reference numerals. In FIG. 8, four permanent magnets 5 are secured to inner sides of the yoke 1 in a form resembling the letter U as viewed from above such that different magnetic poles are opposed to each other via a magnetic gap, and that different magnetic poles appear on adjacent permanent magnets 5. Thus, a magnetic gap 6 is provided between the opposed permanent magnets 5, 5. The movable coil 8 in a flat shape is supported for movements in the magnetic gap 6.

The way of pivotal or swinging movements of the arm 7 is the same as that shown in FIG. 1. The yoke 1 shown in FIG. 8 may be made by the process explained with reference to FIGS. 2 to 7.

Figure 9:
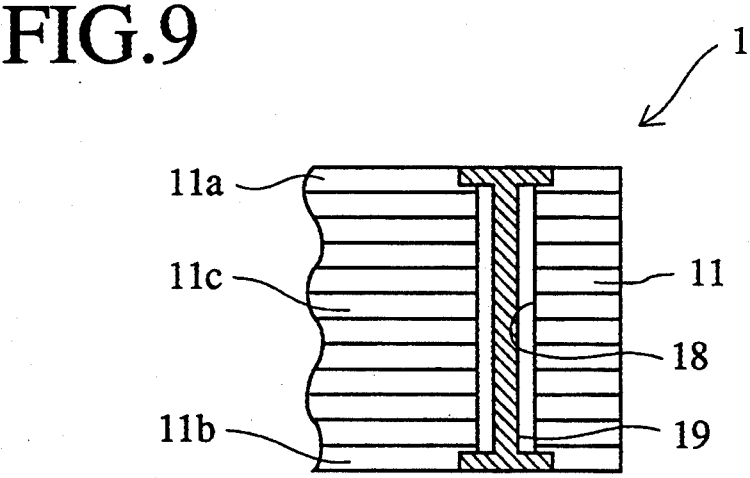
FIG. 9 is a partial cross-sectional view of another arrangement for joining the thin plates 11 in the present invention.

FIG. 9 is a cross-sectional view of another arrangement for stacking the thin plates 11 in the present invention. A rivet hole 18 is made simultaneously with punching the thin plate 11, and after a predetermined number of thin plates are stacked, they are joined together by rivets 19. In this case, to prevent a warpage of the yoke 1, the uppermost thin plate 11a and the lowermost thin plate 11b are preferably thicker than the other thin plates 11c. In this case, bolts or other clamping means may be used in lieu of the rivets 19.

In the above embodiments, an injection molding method is used for covering the yoke 1 and the permanent magnets 5; however, the present invention is not limited to these particular embodiments, but may employ any methods such as simple coating (brushing, spraying, etc.), vapor deposition, electrodeposition, electrostatic coating, immersion in a resin solution, vacuum impregnation, etc. If the injection molding is not used, the permanent magnets 5 are adhered to the yoke 1 before coating. The end plate 16 to be fixed to the open end of the yoke 1 may be omitted. Further, though part of the yoke 1 and the permanent magnets 5 are shaped into arcuate configurations and the movable coil 8 moves along an arcuate orbit in the above embodiments, the present invention envisages other arrangements in which the components and the orbit are straight.

The present invention makes it possible to fabricate the yoke by punching and stacking thin plates at a low cost and with a high accuracy without necessitating subsequent mechanical working. Further, by securing the end plate to the open end of the yoke, a reliable contact between the yoke and the counter yoke member is ensured, thereby to decrease the magnetic resistance and to improve the motor characteristics. Moreover, by integrally covering the yoke and the permanent magnets with a corrosion-resistant material, the motor is protected against corrosion and dust which would contaminate the interior of the motor.

Since the contour of each thin plate constituting the yoke 1 is accurately shaped and since all thin plates are held in accurate alignment with each other by engagement between the projections and recesses in the joggle joint, etc., the thin plates need no mechanical working after lamination thereof. As a result, the fabrication of the voice coil motor is realized with a high accuracy at a low cost.

What is claimed is:

1. A voice coil motor comprising:
   (a) an E-shaped yoke having a center yoke portion and side yoke portions, said yoke being constituted by a plurality of thin plates having the same configuration and stacked together;
   (b) a counter yoke member secured to an open end of said yoke;
   (c) permanent magnets secured to inner sides of the side yoke portions such that the same magnetic poles are opposed;
   (d) a hollow, cylindrical, movable coil supported for movements along the center yoke portion; and
   (e) a covering made of a corrosion-resistant material and provided on outer surfaces of said yoke and said permanent magnets.

2. The voice coil motor according to claim 1, wherein said thin plates stacked together are provided with a projection formed by burring, said projection being threaded to behave as a female screw.

3. The voice coil motor according to claim 1, wherein an end plate made of a soft-magnetic material is fixed to an open end of said yoke, said end plate having extensions integrally projecting from opposite sides thereof for holding said yoke from both sides, and said end plate being secured to said yoke by said covering formed on said yoke.

4. The voice coil motor according to claim 2, wherein an end plate made of a soft-magnetic material is fixed to an open end of said yoke, said end plate having extensions integrally projecting from opposite sides thereof for holding said yoke from both sides, and said end plate being secured to said yoke by said covering formed on said yoke.

5. A voice coil motor comprising:
(a) a U-shaped yoke constituted by a plurality of thin plates having the same configuration and stacked together;
(b) a counter yoke member secured to an open end of said yoke;
(c) permanent magnets secured to inner sides of said yoke such that different magnetic poles are opposed;
(d) a movable coil supported for movements in a magnetic gap between said permanent magnets; and
(e) a covering made of a corrosion-resistant material and provided on outer surfaces of said yoke and said permanent magnets.

6. The voice coil motor according to claim 5, wherein said thin plates stacked together are provided with a projection formed by burring, said projection being threaded to behave as a female screw.

7. The voice coil motor according to claim 5, wherein an end plate made of a soft-magnetic material is fixed to an open end of said yoke, said end plate having extensions integrally projecting from opposite sides thereof for holding said yoke from both sides, and said end plate being secured to said yoke by said covering formed on said yoke.

8. The voice coil motor according to claim 6, wherein an end plate made of a soft-magnetic material is fixed to an open end of said yoke, said end plate having extensions integrally projecting from opposite sides thereof for holding said yoke from both sides, and said end plate being secured to said yoke by said covering formed on said yoke.

* * * * *

UNITED STATES PATENT AND TRADEMARK OFFICE
CERTIFICATE OF CORRECTION

PATENT NO. : 5,424,591

DATED : June 13, 1995

INVENTOR(S) : Yoshihiko KURIYAMA

It is certified that error appears in the above-indentified patent and that said Letters Patent is hereby corrected as shown below:

Column 5, line 28, "arc segmental" should be --arc-segmental;

Column 5, line 44, "coveting should be --covering--.

Signed and Sealed this

Second Day of July, 1996

Attest:

BRUCE LEHMAN

*Attesting Officer*      *Commissioner of Patents and Trademarks*